Jan. 11, 1949. E. S. GEORGE 2,458,989
PROCESS OF MAKING MACHINE HANDLES
Filed Aug. 8, 1946 2 Sheets-Sheet 1
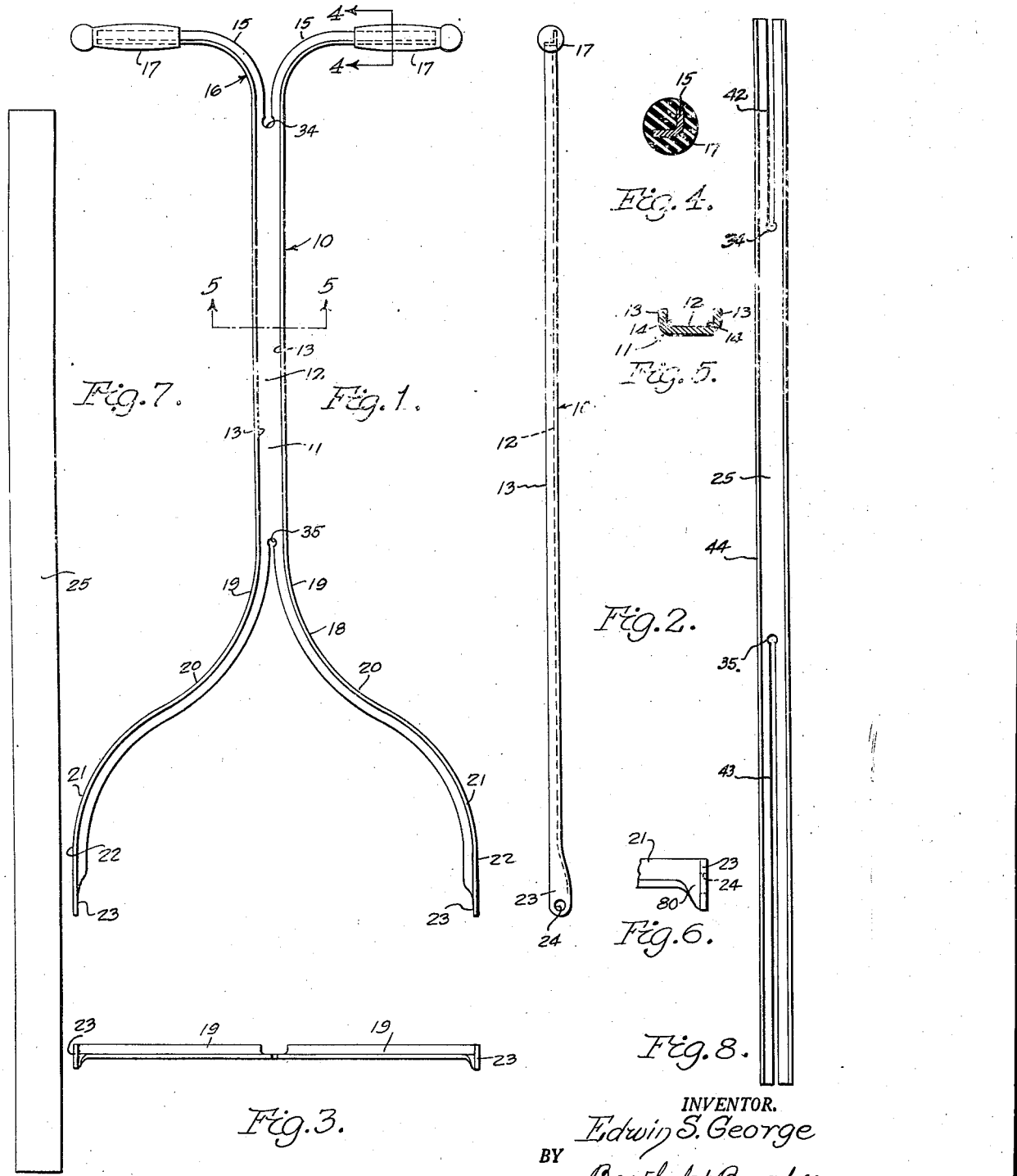
INVENTOR.
Edwin S. George
BY Barthel + Bugbee
ATT'YS Jan. 11, 1949.  E. S. GEORGE  2,458,989
PROCESS OF MAKING MACHINE HANDLES
Filed Aug. 8, 1946  2 Sheets-Sheet 2
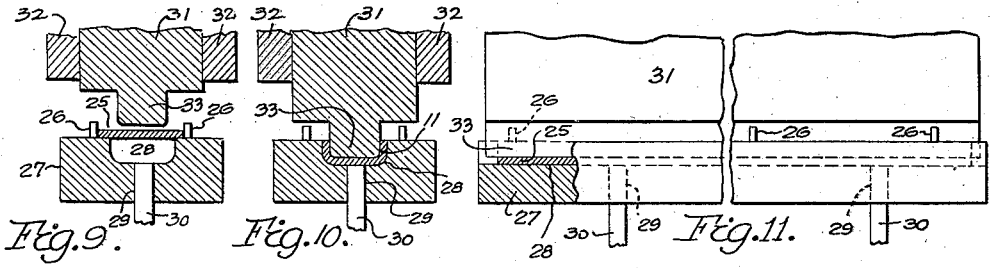
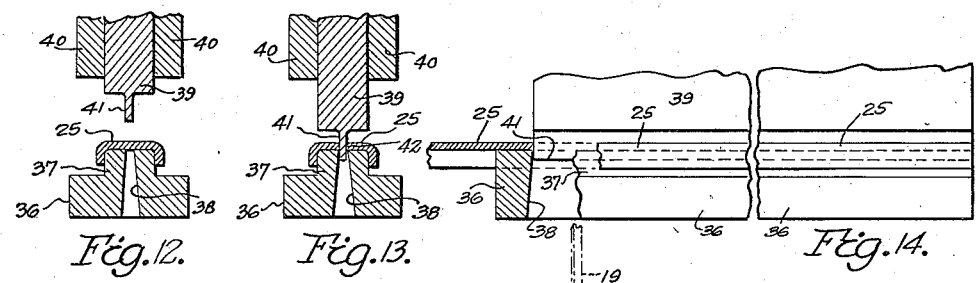
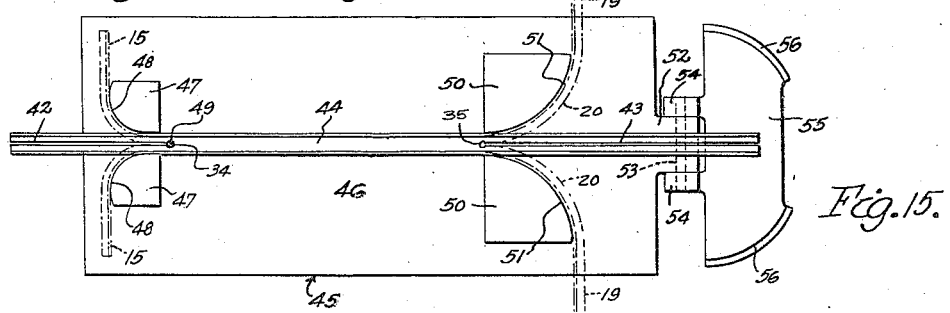
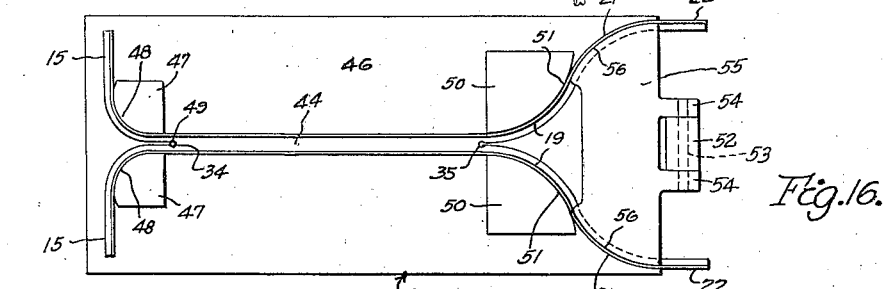
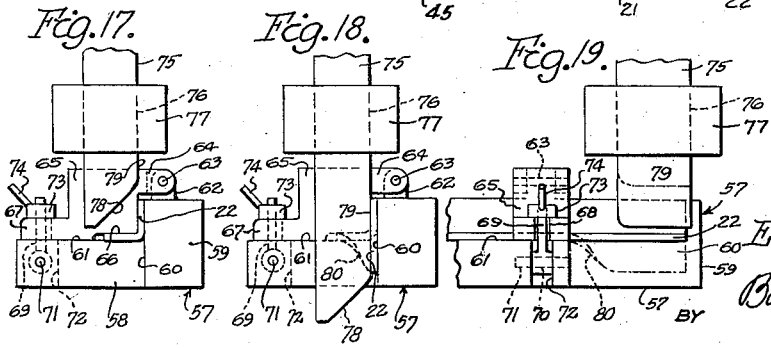
INVENTOR.
Edwin S. George
Barthel & Bugbee
ATTYS Patented Jan. 11, 1949

2,458,989

UNITED STATES PATENT OFFICE 2,458,989

PROCESS OF MAKING MACHINE HANDLES

Edwin S. George, Bloomfield Hills, Mich., assignor to The Moto-Mower Company, Detroit, Mich., a corporation of Michigan Application August 8, 1946, Serial No. 689,213

1 Claim. (Cl. 113—116)

This invention relates to machine or equipment handles and in particular to a process of making a handle similar to that described and claimed in my co-pending application Serial No. 631,984 filed November 30, 1945.

One object of this invention is to provide a process of making a machine or equipment handle from an elongated flat strip of material, preferably sheet metal, by forming strengthening ridges along the opposite long edges of the metal and afterward slotting the opposite ends of the ridged member thus formed and bending apart the arms thus provided to form handle bars at one end and a yoke-shaped portion at the other end for attachment to the machine or equipment.

Another object is to provide a process of making a machine or equipment handle, as set forth in the preceding object, wherein the strengthening ridges are formed by the punch and die operation in a press, after which the slotting of the opposite ends of the ridged member is brought about, preferably also by a punch and die operation.

Another object is to provide a process of making a machine or equipment handle, as set forth in the preceding objects, wherein the bending apart of the slotted end portions is accomplished by placing the slotted and ridged member on a table having guide portions thereon corresponding in curvature to the curvatures desired upon the finished handle, and then bending the arms adjacent the slotted portions outwardly to fit the guide portions on the table.

Another object is to provide a process of making a machine or equipment handle, as set forth in the object immediately preceding, wherein the end of the ridged and slotted member opposite the handle bar end is reversely bent around an additional set of guides to bring the ends of the previously bent arms substantially parallel with one another for attachment to a machine or equipment mounted therebetween, after which the tips of the arms thus formed are preferably subjected to a flattening operation to provide ears for effecting a connection to the machine or equipment to which the handle is to be attached.

Other objects and advantages of the invention will become apparent during the course of the following description of the accompanying drawings, wherein:

Figure 1 is a rear elevation of a completed machine or equipment handle, formed by the process of the present invention;

Figure 2 is a right-hand side elevation of the handle shown in Figure 1;

Figure 3 is a bottom plan view of the handle shown in Figures 1 and 2;

Figure 4 is a cross-section through one of the handle bars, taken along the line 4—4 in Figure 1;

Figure 5 is a cross-section through the shaft of the handle shown in Figures 1 to 3 inclusive, taken along the line 5—5 in Figure 1;

Figure 6 is an enlarged view of the right-hand end of Figure 3, showing one of the ears for attachment to the machine or equipment;

Figure 7 is a front elevation of a sheet metal blank from which the handle of Figures 1 to 6, inclusive, is made, according to the process of the present invention;

Figure 8 is a rear elevation of the partially finished handle made from the blank of Figure 7 after the strengthening ridges on the opposite edges have been formed and the opposite ends slotted prior to bending them into arms;

Figure 9 is a diagrammatic vertical section through a cooperating punch and die in a press about to form the ridged member of Figure 8 from the sheet metal blank shown in Figure 7;

Figure 10 is a view similar to Figure 9 after the punch and die have formed the ridged metal member of Figure 8;

Figure 11 is a side elevation, partly in central vertical section, of the structure shown in Figure 10;

Figure 12 is a diagrammatic vertical section through a slotting punch and die in a press about to slot one end of the ridged member shown in Figure 8;

Figure 13 is a view similar to Figure 12 but showing the parts immediately after the punch and die have formed the slot;

Figure 14 is a side elevation, partly in central vertical section, of the slotting punch and die workpiece shown in Figure 13;

Figure 15 is a top plan view of a bending fixture containing a ridged and slotted member of Figure 8, with the slotted ends thereof about to be bent into a handle bar at one end and a partially formed yoke portion at the opposite end;

Figure 16 is a view similar to Figure 15, but showing the handle bar portion and the yoke portion completely bent;

Figure 17 is a diagrammatic end elevation of a machine about to form a tip of one of the yoke arms of Figure 16 into an ear for the attachment of the handle to a machine or equipment;

Figure 18 is a view similar to Figure 17 but showing the parts in position after the tip has been bent to form the ear; and Figure 19 is a diagrammatic side elevation of a portion of the machine shown in Figure 17 prior to bending the tip to form the ear.

Handle construction

Referring to the drawings in detail, Figure 1 shows a rear elevation of a preferred form of the machine or equipment handle, generally designated 10, made according to the process of the present invention. The handle 10 consists of a shaft portion 11 having a central web 12 (Figure 5) and lateral strengthening ribs or ridges 13 in the form of edge flanges having a rounded connection 14 with the web 12. The upper end of the shaft portion 11 is provided with outwardly bent arms 15 forming a handle bar 16 and having hand grips 17 of rubber or the like mounted upon the ends of the arms 15. The lower end of the shaft portion 11 terminates in a yoke portion 18 having arms 19 curved outwardly as at 20 and then curved inwardly as at 21 to form parallel end portions 22 having flattened ears 23 at the tips thereof. The ears 23 are provided with holes 24 for the reception of pins or fasteners by which the handle 10 is attached to the machine or equipment.

Process of making handle

At the start of the process of making the handle 10, an elongated blank 25 (Figure 7), preferably of sheet metal, is placed between locating pins or projections 26 (Figures 9 to 11) upon a die 27 with an elongated cavity 28 therein shaped to the cross-section form desired for the outside of the handle shaft 11 (Figure 5). The die 27 is mounted upon the bed of a conventional press (not shown), and is provided with bores 29 fitted with knock-out plungers 30 for expulsion of the workpiece. The press platen 31 which reciprocates vertically in guides 32 is provided with a punch 33 having a configuration conforming to the shape of the inside of the shaft portion 11.

After the blank 25 has been positioned, as shown in Figure 9, the press is operated to cause the platen 31 and punch 33 to descend and push the blank 25 into the cavity 28, forming the shaft portion 11 (Figure 10) with the side flanges or ridges 13 (Figure 5) projecting from the web 12 thereof and joined thereto by the curved portion 14. After the operation shown in Figure 10 has been performed, the platen 31 is retracted, withdrawing the punch 33 to the position shown in Figure 9, whereupon the knockout plungers 30 are caused to move upward, ejecting the workpiece.

The workpiece thus formed is now drilled with holes 34 and 35 (Figure 8) at predetermined distances from its opposite ends and is then placed upon a die 36 having an upwardly projecting elongated ridge 37 of a cross-section conforming to the inside of the shaft portion 11 and having an elongated slot 38 therein. The die 36 is mounted upon the bed (not shown) of a press having a platen 39 reciprocable in vertical guides 40 and provided with an elongated thin punch 41 adapted to enter the elongated slot 38. The press is now operated to cause the platen 39 to move downward in the guides 40, thereby causing the elongated punch 41 to pass through the metal at the end of the blank 25, punching out a slot 42 (Figure 8) therein extending as far as the hole 34. The blank 25 is then reversed end for end and a second slot 43 is formed by operating the press a second time in a similar manner, the slot 43 being longer than the slot 42 and extending as far as the hole 35. In this manner, the blank 25 has been transformed into a longitudinally flanged and slotted member 44.

The member 44 is then placed upon a bending fixture generally designated 45 and consisting of a table 46 with a handle bar bending form 47 at one end having curved portions 48 corresponding to the bent portions 15 and also having a locating pin 49 serving as a stop to enter the hole 34 and properly locate the member 44 upon the table 46. The latter is also provided with a pair of bending forms 50 having curved portions 51 corresponding to the curvature of the outwardly bent portions 20 of the yoke arms 19. The end of the table 46 adjacent the bending forms 50 is provided with a tongue 52 carrying a pivot pin 53 passing through the ears 54 of a hinged bending form 55 having curved portions 56 corresponding to the curved portions 21 of the yoke arms 19. The hinged bending form 55 is hingedly mounted so as to be capable of being swung from the inoperative position of Figure 15 to the operative position of Figure 16. In the position of Figure 15, the bending form 55 has its top surface on a level with or slightly below the level of the table 46 so as not to interfere with the preliminary bending operations thereon.

With the member 44 placed in the position shown on the bending fixture 45 and with the locating pin 49 passing through the hole 34 thereof, the portions of the member 44 on opposite sides of the slot 42 are grasped and bent away from one another into the dotted line positions shown in Figure 15. While this is being done, the curved portions of the bending forms 47 form the curved portions of the arms 15, the straight ends projecting therebeyond and resulting in the shape of the arms 15 shown at the left-hand end of Figure 16.

In a similar manner, the portions of the member 44 adjacent the slot 43 are then grasped and bent outward away from one another against the bending forms 50 into the dotted line positions shown in Figure 15, so that the curved portions 51 of the bending forms 50 form the outwardly curved portions 20 of the yoke arms 19. The remainder of the portions are, for the moment, left projecting outward beyond the bending forms 50 in the manner shown in the dotted line positions of Figure 15. The holes 34 and 35 during these bending operations serve to prevent splitting of the shaft portion 11 therebeyond.

The bending form 55 is then swung upward and to the left from its inoperative position of Figure 5 to its operative position of Figure 16, so that it rests upon the top of the table 46. The ends of the yoke arms 19, which have been previously left projecting outward in opposite directions substantially perpendicular to the remainder of the member 44 are now grasped and drawn inwardly into the solid line positions shown in Figure 16, thereby causing the curved portions 56 to form the inwardly curved portions 21 upon the yoke arms 19, leaving the end portions 22 projecting substantially parallel to one another from the bending fixture 45 (Figure 16).

The member 44 thus formed is removed from the bending fixture 45 and placed in a forming device 57 to form the ears 23 upon the end portions 22. The forming device 57 consists of a die 58 (Figures 17 and 19) having an anvil portion 59 projecting horizontally therefrom. The anvil portion 59 is provided with an abutment surface 60 extending vertically thereon and also extending upward and downward from the supporting surface 61. The anvil portion 59 is provided with an upwardly extending boss 62 carrying a horizontal pivot pin 63 fastened through spaced ears 64. The latter project horizontally from the rearward end of a clamping member 65 having an L-shaped portion 66 spaced above the surface 61 and away from the abutment surface 60 a sufficient distance to accommodate the end portion 22. The forward end of the clamping member 65 is provided with a tongue 67 with a slot 68 adapted to receive a swinging clamping bolt 69. The lower end of the latter is provided with a bore 70 receiving a pivot pin 71 mounted in the die 58 and spanning the slot 72 therein (Figures 17 and 19). The upper end of the swinging clamping bolt 69 is threaded to receive a nut 73 having an operating handle 74 thereon. Cooperating with the foregoing structure is a punch 75 reciprocable vertically in a bore 76 passing through a guide member 77 and having an inclined forward end 78 thereon positioned at an obtuse angle to the rearward edge 79 of the punch 75.

To form the ear 23 upon the end 22, the latter is clamped between the clamping member 65 and the surfaces 60 and 61 with the L-shaped portion 66 urging the end 22 against the abutment surface 60 of the anvil 59. The clamping nut 73 is now screwed down upon the tongue 67 to securely lock the parts in the positions shown in Figures 17 and 19.

The forming device 57 is now operated to cause the punch 75 to move downward. As the inclined portion encounters the horizontal part of the end 22, which projects beyond the die 58 (Figure 19), it forces the latter downward into the position shown by the dotted lines in Figure 19 after which the vertical portion 79 of the punch 75 comes into operation to flatten out the portion thus pushed downward so that the ear 23 is thus formed against the abutment surface 60 of the anvil portion 59, leaving a partially twisted connecting portion 80 extending between it and the end portion 22. The other end portion 22 is formed with an ear 23 in the same manner, but in an oppositely arranged forming device 57, resulting in the formation of the second ear as shown in Figures 1 and 3. The two ears 23 are then drilled to form the holes 24 in an ordinary drill press or with the aid of an ordinary punch and die. The hand grips 17 of rubber or other suitable material are then forced upon the oppositely projecting ends 18 of the handle bar 16 and are cemented or otherwise firmly secured in position, completing the process of forming the handle, except for the usual painting or surface finishing operations. The latter are conducted according to conventional methods, forming no part of the present invention.

While I have shown and described my invention in detail, it is to be understood that the same is to be limited only by the appended claim, for many changes may be made without departing from the spirit and scope of my invention.

What I claim is:

A process of making a machine or equipment handle from sheet stock comprising forming flanges along the longitudinal edges of an elongated strip of sheet stock, forming apertures through said strip at locations spaced inwardly at predetermined distances from the opposite ends of said strip, longitudinally slotting the end portions of the flanged strip as far as said apertures, bending the slotted portions at one end of the strip outwardly in opposite directions to form a cross bar, and spreading apart the slotted portions at the opposite end of the strip to form a yoke portion for attachment to a machine.

EDWIN S. GEORGE.

REFERENCES CITED

The following references are of record in the file of this patent:

UNITED STATES PATENTS

| Number | Name | Date |
|---|---|---|
| 271,471 | Johnston | Jan. 30, 1883 |
| 1,486,758 | Jerrain | Mar. 11, 1924 |
| 2,252,126 | Kersey | Aug. 12, 1941 |
| 2,281,923 | Davis | May 5, 1942 |
| D. 117,693 | Kluter | Nov. 21, 1939 |

FOREIGN PATENTS

| Number | Country | Date |
|---|---|---|
| 52,246 | Austria | Feb. 26, 1912 |